(12) United States Patent
Itagaki

(10) Patent No.: US 9,555,797 B2
(45) Date of Patent: Jan. 31, 2017

(54) CONTROL APPARATUS FOR HYBRID VEHICLE

(71) Applicant: TOYOTA JIDOSHA KABUSHIKI KAISHA, Toyota-shi, Aichi (JP)

(72) Inventor: Kenji Itagaki, Suntou-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 53 days.

(21) Appl. No.: 14/589,093

(22) Filed: Jan. 5, 2015

(65) Prior Publication Data

US 2015/0191167 A1 Jul. 9, 2015

(30) Foreign Application Priority Data

Jan. 8, 2014 (JP) ................. 2014-001604

(51) Int. Cl.
| | | |
|---|---|---|
| *B60W 10/08* | (2006.01) | |
| *B60W 20/00* | (2016.01) | |
| *B60W 10/02* | (2006.01) | |
| *B60K 6/445* | (2007.10) | |
| *B60L 3/00* | (2006.01) | |
| *B60W 10/06* | (2006.01) | |
| *B60W 30/184* | (2012.01) | |
| *B60L 11/12* | (2006.01) | |
| *B60L 11/14* | (2006.01) | |

(Continued)

(52) U.S. Cl.
CPC .............. *B60W 20/40* (2013.01); *B60K 6/445* (2013.01); *B60L 3/003* (2013.01); *B60L 3/0061* (2013.01); *B60L 11/123* (2013.01); *B60L 11/14* (2013.01); *B60L 11/1874* (2013.01); *B60L 15/2054* (2013.01); *B60W 10/06* (2013.01); *B60W 10/08* (2013.01); *B60W 20/10* (2013.01); *B60W 30/1843* (2013.01); *B60K 2006/381* (2013.01); *B60L 2210/40* (2013.01); *B60L 2240/12* (2013.01); *B60L 2240/36* (2013.01);

(Continued)

(58) Field of Classification Search
None
See application file for complete search history.

(56) References Cited

U.S. PATENT DOCUMENTS 6,269,290 B1 * 7/2001 Egami ...................... B60K 6/26
290/45
6,808,470 B2 * 10/2004 Boll ......................... B60K 6/442
180/65.23

(Continued)

FOREIGN PATENT DOCUMENTS

EP     2698615 A1 *  2/2014  ............. H02H 6/005
JP     2002-195065 A   7/2002

(Continued)

*Primary Examiner* — Jean-Paul Cass
(74) *Attorney, Agent, or Firm* — Andrews Kurth Kenyon LLP

(57) ABSTRACT

In a control apparatus of the present invention, when a predetermined engagement condition is satisfied while an internal combustion engine is operated, first a rotating speed control which makes a first MG output a torque so that a rotating speed of the first MG becomes zero is executed, and subsequently an engagement control which switches a state of a lock mechanism to an engagement state is executed when an engagement switching condition is satisfied during execution of the rotating speed control. When a temperature of a first inverter of the first MG becomes equal to or higher than an engagement prohibition temperature which is lower than a working upper limit temperature during the execution of the rotating speed control, the execution of the engagement control is prohibited.

7 Claims, 10 Drawing Sheets

(51) Int. Cl.
  *B60L 11/18* (2006.01)
  *B60L 15/20* (2006.01)
  *B60K 6/38* (2007.10)

(52) U.S. Cl.
  CPC ... *B60L 2240/421* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60L 2240/525* (2013.01); *B60L 2240/662* (2013.01); *B60W 2710/081* (2013.01); *Y02T 10/6217* (2013.01); *Y02T 10/6239* (2013.01); *Y02T 10/6286* (2013.01); *Y02T 10/645* (2013.01); *Y02T 10/7005* (2013.01); *Y02T 10/705* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01); *Y10S 903/93* (2013.01)

(56) References Cited

U.S. PATENT DOCUMENTS

| | | | |
|---|---|---|---|
| 6,832,148 B1 * | 12/2004 | Bennett | B60K 6/445 180/65.225 |
| 2002/0079148 A1 | 6/2002 | Aoki et al. | |
| 2005/0080523 A1 * | 4/2005 | Bennett | B60K 6/445 701/22 |
| 2008/0149407 A1 * | 6/2008 | Shibata | B60K 6/40 180/65.27 |
| 2008/0255716 A1 * | 10/2008 | Bandai | B60T 1/10 701/22 |
| 2009/0082154 A1 * | 3/2009 | Iwase | B60K 6/445 475/150 |
| 2009/0088294 A1 * | 4/2009 | West | G05D 23/1934 318/472 |
| 2013/0151048 A1 * | 6/2013 | Kwon | B60K 6/445 701/22 |
| 2014/0228167 A1 * | 8/2014 | Frank | B60K 6/442 477/5 |

FOREIGN PATENT DOCUMENTS

| | | |
|---|---|---|
| JP | 2010-011546 A | 1/2010 |
| JP | 2010-111191 A | 2/2010 |
| JP | 2010 111193 A | 5/2010 |
| JP | 2010-215007 A | 9/2010 |
| JP | 2010-247747 A | 11/2010 |
| JP | 2010-284998 A | 12/2010 |
| JP | 2012-040928 A | 3/2012 |
| JP | 2013 091361 A | 5/2013 |

* cited by examiner

CONTROL APPARATUS FOR HYBRID VEHICLE

CROSS-REFERENCE TO RELATED APPLICATION

The present application claims priority to Japanese Patent Application No. 2014-001604 filed on Jan. 8, 2014, which is incorporated herein by reference in its entirety.

TECHNICAL FIELD

The present invention relates to a control apparatus applied to a hybrid vehicle including: a power split mechanism which is connected with an internal combustion engine, an electric motor, and an output portion; and an engagement mechanism which is capable of switching between an engagement state where rotation of an output shaft of the electric motor is prevented and a release state where the rotation of the output shaft is permitted.

BACKGROUND ART

There is known a hybrid vehicle that includes a power split mechanism which is connected with an internal combustion engine, a motor generator, and an output portion, and that is capable of splitting power of the internal combustion engine into the output portion and the motor generator by the power split mechanism. In such a vehicle, there is known a vehicle that is provided with an engagement mechanism which is capable of switching between an engagement state where an output shaft of the motor generator is locked so as not to rotate and a release state where the output shaft locked is released, and that a variable gear ratio mode and a fixed gear ratio mode are realized by switching a state of the engagement mechanism (see Patent Literature 1). In addition, there are Patent Literatures 2-5 as prior art references in relation to the present invention.

CITATION LIST

Patent Literature

Patent Literature 1: JP 2010-284998 A
Patent Literature 2: JP 2010-215007 A
Patent Literature 3: JP 2010-111191 A
Patent Literature 4: JP 2010-011546 A
Patent Literature 5: JP 2012-040928 A

SUMMARY OF INVENTION

Technical Problem

In general, with respect to a motor generator and an inverter of the motor generator, upper limit temperatures are set respectively. And, when temperature of the motor generator or the inverter is equal to or higher than the upper limit temperature, an output power of the motor generator is limited. In the vehicle of the Patent Literature 1, when the engagement mechanism is switched to the engagement state from the release state during an operation of the internal combustion engine, the motor generator is controlled so that rotating speed of the motor generator becomes zero. In this case, since the motor generator is controlled so that the rotating speed becomes zero while receiving reaction torque of the internal combustion engine, the temperature of each of the motor generator and the inverter is easy to increase. Thereby, in a case that the temperature of the motor generator or the inverter is high before the engagement mechanism is switched to the engagement state, there is a possibility that the temperature of the motor generator or the inverter becomes equal to or higher than the upper limit temperature, when the motor generator is controlled so that the rotating speed becomes zero. In this case, since a control of the rotating speed (a rotating speed control) of the motor generator is executed again after the temperature of the motor generator or the temperature of the inverter decreases, there is a possibility that hunting of the control occurs.

In view of the foregoing, one object of the present invention is to provide a control apparatus for a hybrid vehicle capable of suppressing an occurrence of hunting of a control of an electric motor when a state of an engagement mechanism is switched.

Solution to Problem

A first control apparatus of the present invention is applied to a hybrid vehicle, the hybrid vehicle including: an internal combustion engine; an electric motor; an output portion transmitting torque to a drive wheel; a power split mechanism having a first rotational element, a second rotational element, and a third rotational element which are capable of differentially rotating with respect to each other, the first rotational element being connected to an output shaft of the internal combustion engine, the second rotational element being connected to an output shaft of the electric motor, and the third rotational element being connected to a transmission member of the output portion; and an engagement mechanism which is capable of switching between an engagement state where the output shaft of the electric motor is locked so as not to rotate and a release state where a rotation of the output shaft of the electric motor is permitted, the control apparatus limiting, in a case that a monitoring target temperature to be monitored when the electric motor is controlled becomes equal to or higher than a predetermined upper limit temperature when torque is output from the electric motor, an output of the torque from the electric motor, wherein the control apparatus controls the electric motor and the engagement mechanism, and the control apparatus is programmed so as to include control programming instructions to: first execute a rotating speed control which makes the electric motor output a torque according to an output torque of the internal combustion engine so that a rotating speed of the electric motor becomes zero, in a case that a predetermined engagement condition for a permission to switch a state of the engagement mechanism from the release state to the engagement state is satisfied while the internal combustion engine is operated; and subsequently execute an engagement control which switches a state of the engagement mechanism to the engagement state when a predetermined engagement switching condition is satisfied during an execution of the rotating speed control, and switching prohibition programming instructions to prohibit an execution of the engagement control, when the monitoring target temperature becomes equal to or higher than a predetermined engagement prohibition temperature which is lower than the predetermined upper limit temperature during the execution of the rotating speed control.

According to the first control apparatus of the present invention, since the execution of the engagement control is prohibited when the monitoring target temperature becomes equal to or higher than the engagement prohibition temperature during the execution of the rotating speed control, it is possible to suppress an occurrence of hunting of a control of the electric motor when the state of the engagement mechanism is switched to the engagement state. Furthermore, since the engagement prohibition temperature is lower than the upper limit temperature, the engagement control is prohibited before the monitoring target temperature becomes high. Thereby, since it is possible to suppress an increase of the monitoring target temperature to the vicinity of the upper limit temperature, it is possible to suppress a limitation of an operation of the electric motor because of the monitoring target temperature.

In one embodiment of the first control apparatus of the present invention, the switching prohibition programming instructions may further comprise programming instructions to determine whether or not the monitoring target temperature becomes equal to or higher than the engagement prohibition temperature, in a period when the electric motor is controlled at equal power during the execution of the rotating speed control. In the period when the electric motor is controlled at equal power, the monitoring target temperatures, such as a temperature of the electric motor, a temperature of an inverter of the electric motor, and the like to be monitored when the electric motor is controlled, are hardly changed. Thereby, the determination whether or not to prohibit the engagement control can be performed with higher precision. Furthermore, this period is also a period where the internal combustion engine is operated at equal power. Thereby, it is possible to suppress an unnecessary fluctuation of rotating speed of the internal combustion engine. Accordingly, it is possible to suppress a vibration of the vehicle.

In one embodiment of the first control apparatus of the present invention, the switching prohibition programming instructions may further comprise programming instructions to determine whether or not the monitoring target temperature becomes equal to or higher than the engagement prohibition temperature, in a period where until the rotating speed of the electric motor enters a predetermined rotating speed range which is set in a vicinity of zero, during the execution of the rotating speed control. Until the rotating speed of the electric motor enters the predetermined rotating speed range, the internal combustion engine is operated at equal power. Thereby, also in this embodiment, it is possible to suppress the unnecessary fluctuation of the rotating speed of the internal combustion engine. Accordingly, it is possible to suppress the vibration of the vehicle.

In one embodiment of the first control apparatus of the present invention, the switching prohibition programming instructions may further comprise programming instructions to adjust the engagement prohibition temperature based on a change of the monitoring target temperature obtained in a previous time when the engagement mechanism was switched to the engagement state from the release state. By adjusting the engagement prohibition temperature in this manner, it is possible to suppress an unnecessary prohibition of the engagement control of the engagement mechanism.

In one embodiment of the first control apparatus of the present invention, the control programming instructions comprise may further programming instructions to: first execute a torque control which makes the electric motor output a torque according to the output torque of the internal combustion engine, in a case that a predetermined release condition for a permission to switch a state of the engagement mechanism from the engagement state to the release state is satisfied while the internal combustion engine is operated; and subsequently execute a release control which switches the state of the engagement mechanism to the release state when a predetermined release switching condition is satisfied during an execution of the torque control, and the switching prohibition programming instructions may further comprise programming instructions to prohibit an execution of the release control, when the monitoring target temperature becomes equal to or higher than a predetermined release prohibition temperature which is lower than the predetermined upper limit temperature during the execution of the torque control. According to this embodiment, since the execution of the release control is prohibited when the monitoring target temperature becomes equal to or higher than the release prohibition temperature during the execution of the torque control, it is possible to suppress an occurrence of hunting of a control of the electric motor when the state of the engagement mechanism is switched to the release state. Furthermore, since the release prohibition temperature is lower than the upper limit temperature, it is possible to suppress an increase of the monitoring target temperature to the vicinity of the upper limit temperature. Thereby, it is possible to suppress a limitation of an operation of the electric motor because of the monitoring target temperature.

In this embodiment, the switching prohibition programming instructions may further comprise programming instructions to adjust the release prohibition temperature based on a change of the monitoring target temperature obtained in a previous time when the engagement mechanism was switched to the release state from the engagement state. By adjusting the release prohibition temperature in this manner, it is possible to suppress an unnecessary prohibition of the release control of the engagement mechanism.

A second control apparatus of the present invention is applied to a hybrid vehicle, the hybrid vehicle including: an internal combustion engine; an electric motor; an output portion transmitting torque to a drive wheel; a power split mechanism having a first rotational element, a second rotational element, and a third rotational element which are capable of differentially rotating with respect to each other, the first rotational element being connected to an output shaft of the internal combustion engine, the second rotational element being connected to an output shaft of the electric motor, and the third rotational element being connected to a transmission member of the output portion; and an engagement mechanism which is capable of switching between an engagement state where the output shaft of the electric motor is locked so as not to rotate and a release state where a rotation of the output shaft of the electric motor is permitted, the control apparatus limiting, in a case that a monitoring target temperature to be monitored when the electric motor is controlled becomes equal to or higher than a predetermined upper limit temperature when torque is output from the electric motor, an output of the torque from electric motor, wherein the control apparatus controls the electric motor and the engagement mechanism, and the control apparatus is programmed so as to include control programming instructions to: first execute a torque control which makes the electric motor output a torque according to output torque of the internal combustion engine, in a case that a predetermined release condition for a permission to switch a state of the engagement mechanism from the engagement state to the release state is satisfied while the internal combustion engine is operated; and subsequently execute a release control which switches the state of the engagement mechanism to the release state when a predetermined release switching condition is satisfied during an execution of the torque control, and switching prohibition programming instructions to prohibit an execution of the release control, when the monitoring target temperature becomes equal to or higher than a predetermined release prohibition temperature which is lower than the predetermined upper limit temperature during the execution of the torque control.

According to the second control apparatus of the present invention, since the execution of the release control is prohibited when the monitoring target temperature becomes equal to or higher than the release prohibition temperature during the execution of the torque control, it is possible to suppress an occurrence of hunting of a control of the electric motor when the state of the engagement mechanism is switched to the release state. Furthermore, since the release prohibition temperature is lower than the upper limit temperature, it is possible to suppress an increase of the monitoring target temperature to the vicinity of the upper limit temperature. Thereby, it is possible to suppress a limitation of an operation of the electric motor because of the monitoring target temperature.

DESCRIPTION OF EMBODIMENTS

Figure 1:
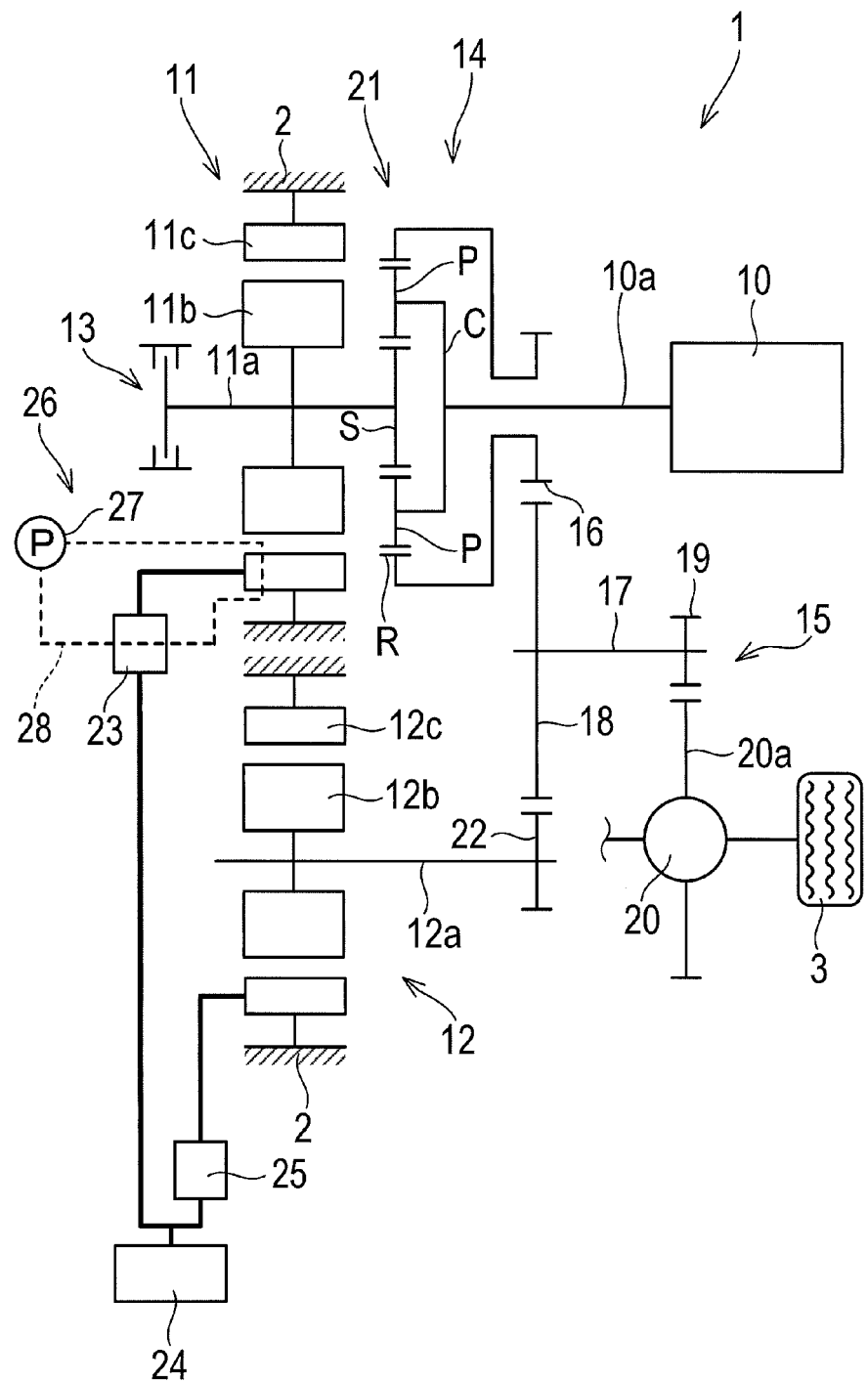
FIG. 1 is a schematic diagram showing a vehicle where a control apparatus according to one embodiment of the present invention is incorporated.

FIG. 1 schematically shows a vehicle where a control apparatus according to one embodiment of the present invention is incorporated. The vehicle 1 is configured as a hybrid vehicle where plural power sources are mounted. The vehicle 1 includes an internal combustion engine (hereinafter, referred to as an engine) 10, a first motor generator (hereinafter, referred to as a first MG) 11, and a second motor generator (hereinafter, referred to as a second MG) 12.

The engine 10 is a well known spark ignition type internal combustion engine having plural cylinders. Each of the first MG 11 and the second MG 12 is a well known motor generator which is mounted on a hybrid vehicle to function as an electric motor and a generator. The first MG 11 includes a rotor 11b which rotates integrally with an output shaft 11a and a stator 11c which is arranged on an outer circumference of the rotor 11b coaxially and is fixed to a case 2. Similarly, the second MG 12 also includes a rotor 12b which rotates integrally with an output shaft 12a and a stator 12c which is arranged on an outer circumference of the rotor 12b coaxially and is fixed to the case 2. A lock mechanism 13 as an engagement mechanism is provided on the output shaft 11a of the first MG 11. The lock mechanism 13 is configured so as to be allowed to switch between an engagement state where the output shaft 11a is locked so as not to rotate and a release state where the output shaft 11a locked is released and a rotation of the output shaft 11a is permitted. The lock mechanism 13 is configured as a meshing type brake. However, the lock mechanism 13 may be changed to a friction type brake.

An output shaft 10a of the engine 10 and the output shaft 11a of the first MG 11 are connected with a power split mechanism 14. An output portion 15 for transmitting power to drive wheels 3 of the vehicle 1 is also connected with the power split mechanism 14. The output portion 15 includes a first drive gear 16, a counter gear 18 which, while being meshed with the first drive gear 16, is fixed to an output shaft 17, and an output gear 19 which is fixed to the output shaft 17. The output gear 19 is meshed with a ring gear 20a which is provided in a case of a differential mechanism 20. The differential mechanism 20 is a well known mechanism which distributes power which is transmitted to the ring gear 20a to right and left drive wheels 3. In this figure, only one of the right and left drive wheels 3 is shown.

The power split mechanism 14 includes a planetary gear mechanism 21 as a differential mechanism. The planetary gear mechanism 21 is a single pinion type planetary gear mechanism. The planetary gear mechanism 21 includes a sun gear S, a ring gear R, pinion gears P, and a carrier C. The sun gear S is an external gear. The ring gear R is an internal gear disposed coaxially with the sun gear S. The pinion gears P mesh with the sun gear S and the ring gear R respectively. The carrier C supports the pinion gears P so that the pinion gears P are capable of rotating and also capable of revolving around the sun gear S. The sun gear S is connected with the output shaft 11a of the first MG 11. The carrier C is connected with the output shaft 10a of the engine 10. The ring gear R is connected with the first drive gear 16.

A second drive gear 22 is provided on the output shaft 12a of the second MG 12. The second drive gear 22 meshes with the counter gear 18.

The first MG 11 is connected electrically with a battery 24 via an electric circuit including a first inverter 23. Similarly, the second MG 12 is also connected electrically with the battery 24 via an electric circuit including a second inverter 25. In the vehicle 1, a cooling system 26 for cooling the first MG 11 and the first inverter 23 is provided. The cooling system 26 includes a cooling water passage 28 for circulating cooling water by a pump 27. As shown in this figure, the cooling water passage 28 is formed so as to pass through the first MG 11 and the first inverter 23. In addition, the cooling water passage 28 is also formed so as to pass through a radiator and a reservoir tank (not shown). In the cooling system 26, by circulating the cooling water by the pump 27, the first MG 11 and the first inverter 23 are cooled.

Figure 2:
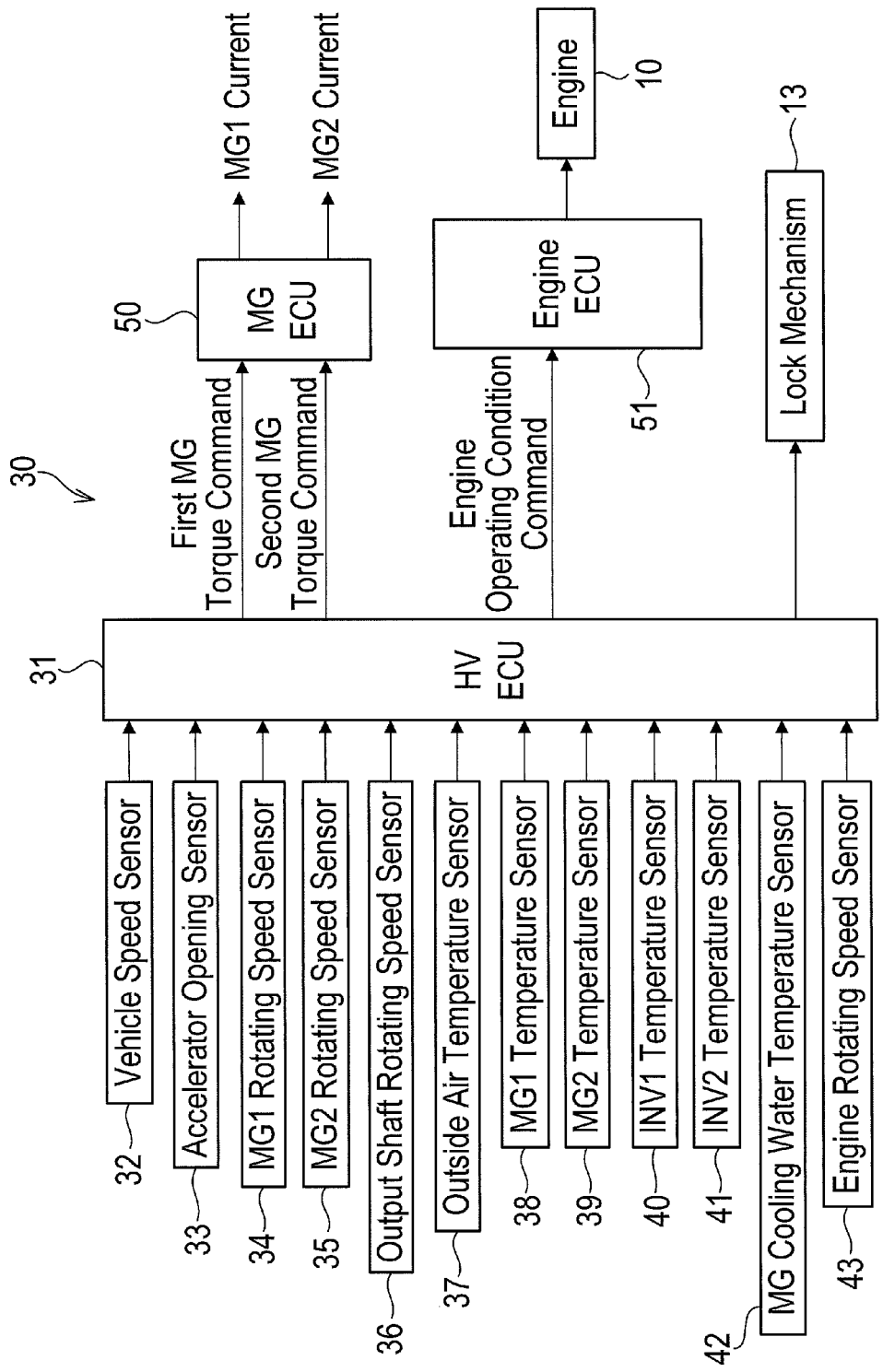
FIG. 2 is a block diagram showing a control system of the vehicle.

FIG. 2 shows a control apparatus 30 for controlling each part of the vehicle 1. The control apparatus 30 includes various electronic control units (ECU). Each ECU is configured as a computer unit including a microprocessor and peripheral devices, such as a RAM and a ROM, which are necessary for the operations of the microprocessor. To an HVECU 31, input are signals from various sensors. For example, output signals of a vehicle speed sensor 32, an accelerator opening sensor 33, an MG1 rotating speed sensor 34, an MG2 rotating speed sensor 35, an output shaft rotating speed sensor 36, an outside air temperature sensor 37, an MG1 temperature sensor 38, an MG2 temperature sensor 39, an INV1 temperature sensor 40, an INV2 temperature sensor 41, an MG cooling water temperature sensor 42, an engine rotating speed sensor 43, and so on, are inputted to the HVECU 31. The vehicle speed sensor 32 outputs a signal corresponding to speed of the vehicle 1 (vehicle speed). The accelerator opening sensor 33 outputs a signal corresponding to an operation amount of an accelerator pedal (not shown), that is, an accelerator opening. The MG1 rotating speed sensor 34 outputs a signal corresponding to rotating speed of the output shaft 11a of the first MG 11. The MG2 rotating speed sensor 35 outputs a signal corresponding to rotating speed of the output shaft 12a of the second MG 12. The output shaft rotating speed sensor 36 outputs a signal corresponding to rotating speed of the output shaft 17. The outside air temperature sensor 37 outputs a signal corresponding to outside air temperature. The MG1 temperature sensor 38 outputs a signal corresponding to temperature of the first MG 11. The MG2 temperature sensor 39 outputs a signal corresponding to temperature of the second MG 12. The INV1 temperature sensor 40 outputs a signal corresponding to temperature Tinv1 of the first inverter 23. The INV2 temperature sensor 41 outputs a signal corresponding to temperature of the second inverter 25. The MG cooling water temperature sensor 42 outputs a signal corresponding to temperature of the cooling water of the cooling system 26. The engine rotating speed sensor 43 outputs a signal corresponding to rotating speed of the output shaft 10a of the engine 10. In addition, various sensors are further connected to the HVECU 31, but they are omitted in the figure. Hereinafter, the rotating speed of the output shaft 11a of the first MG 11 is referred to as the rotating speed of the first MG 11.

Furthermore, the rotating speed of the output shaft 12a of the second MG 12 is also referred to as the rotating speed of the second MG 12, and the rotating speed of the output shaft 10a of the engine 10 is also referred to as the rotating speed of the engine 10.

The HVECU 31 calculates torque which is generated by each of the first MG 11 and the second MG 12, and outputs commands to an MGECU 50 with regard to the torques to be generated. Furthermore, the HVECU 31 determines an operating condition of the engine 10, and outputs commands to an engine ECU 51 with regard to the operating condition of the engine 10. The HVECU 31 further controls the lock mechanism 13. In addition, the HVECU 31 further controls other controlled objects which are provided on the vehicle 1, but they are omitted in the figure.

The MGECU 50 calculates current values corresponding to the torques to be generated by each of the first MG 11 and the second MG 12 based on the commands which were inputted from the HVECU 31. And, the MGECU 50 controls the current values of each of the first MG 11 and the second MG 12. The engine ECU 51 performs various controls for various parts of the engine 10, such as a throttle valve, an ignition plug, and a injector, based on the commands which were inputted from the HVECU 31.

Figure 3:
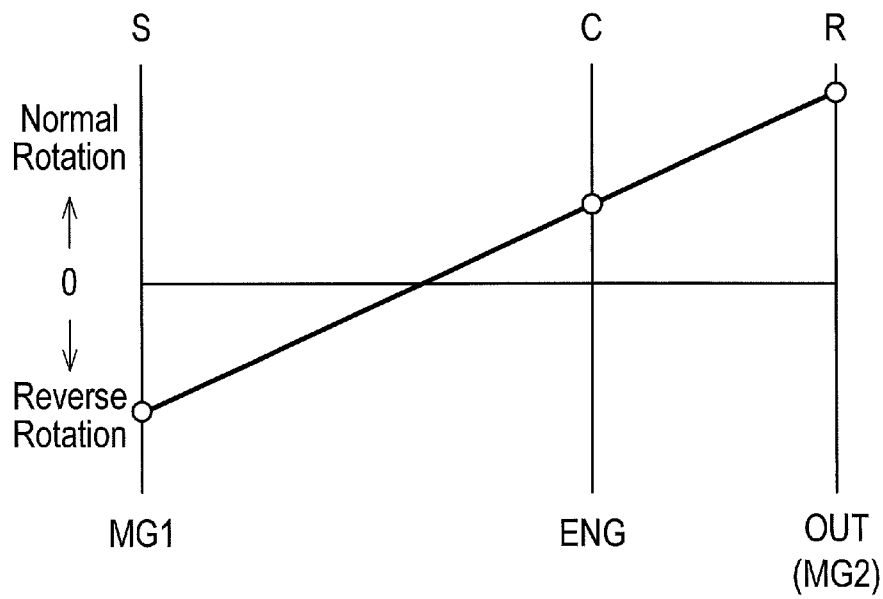
FIG. 3 is a diagram showing an example of an alignment chart of the power split mechanism in the variable gear ratio mode.
Figure 4:
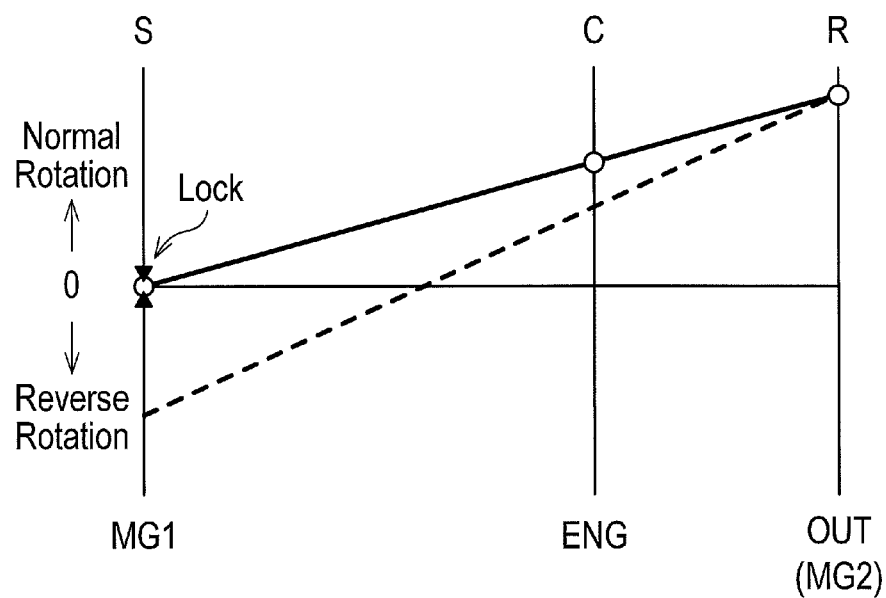
FIG. 4 is a diagram showing an example of an alignment chart of the power split mechanism in the fixed gear ratio mode.

In the vehicle 1, as gear ratio modes, a variable gear ratio mode and a fixed gear ratio mode are provided. In the variable gear ratio mode, a state of the lock mechanism 13 is switched to the release state. On the other hand, in the fixed gear ratio mode, a state of the lock mechanism 13 is switched to the engagement state. FIG. 3 shows an example of an alignment chart of the power split mechanism 14 in the variable gear ratio mode. FIG. 4 shows an example of an alignment chart of the power split mechanism 14 in the fixed gear ratio mode. In FIG. 4, a relation in the variable gear ratio mode is shown by a broken line as a comparative example. In these figures, "MG1" shows the first MG 11, "ENG" shows the engine 10, "MG2" shows the second MG 12, and "OUT" shows the output shaft 17. Furthermore, "S" shows the sun gear S, "C" shows the carrier C, and "R" shows the ring gear R.

In the variable gear ratio mode, since the lock mechanism 13 is in the release state, a rotation of each of the output shaft 11a of the first MG 11 and the sun gear S is permitted. Thereby, as shown in FIG. 3, even though the rotating speed of the engine 10 is constant, by changing the rotating speed of the first MG 11 and a rotating direction of the first MG 11, it is possible to change the rotating speed of the output shaft 17 continuously. On the other hand, in the fixed gear ratio mode, since the lock mechanism 13 is switched to the engagement state, the output shaft 11a of the first MG 11 and the sun gear S are locked so as not to rotate. Thereby, as shown in FIG. 4, the rotating speed of the output shaft 17 is changed according to the rotating speed of the engine 10. As is obvious from this figure, in the fixed gear ratio mode, the rotating speed of the sun gear S is fixed to zero. Thereby, the rotating speed of the output shaft 17 becomes greater than the rotating speed of the engine 10.

Figure 5:
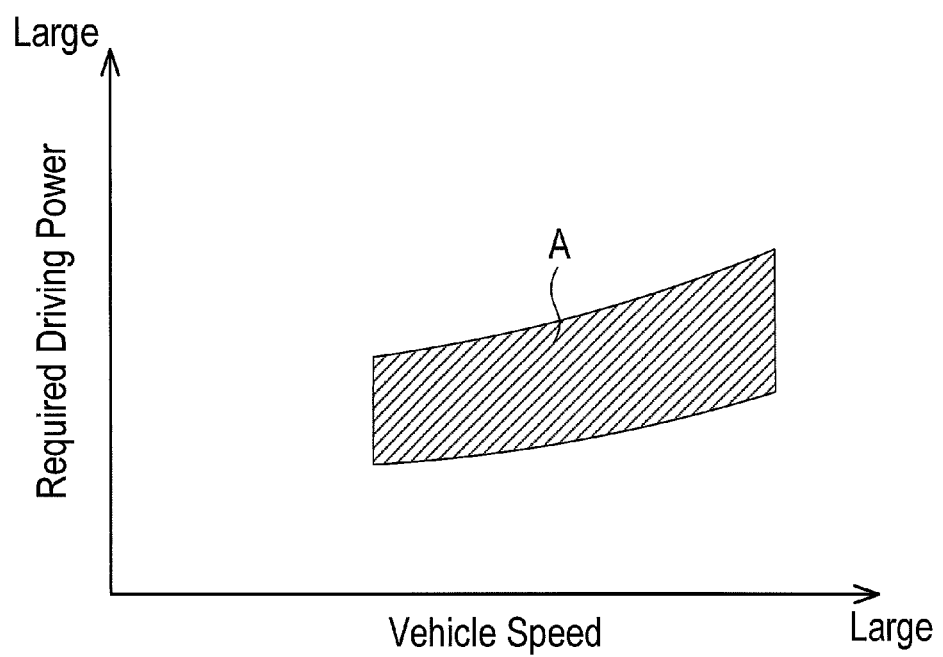
FIG. 5 is a diagram showing an example of a relation between vehicle speed and required driving power, and gear ratio modes.

These gear ratio modes are switched according to the vehicle speed and driving power required to the vehicle 1 (required driving power). FIG. 5 shows an example of a relation between the vehicle speed and the required driving power, and the gear ratio modes. A region A in this figure is an operation region where the gear ratio mode is switched to the fixed gear ratio mode. Thereby, when an operating point of the vehicle 1 specified by the vehicle speed and the required driving power exists inside region A, the gear ratio mode is switched to the fixed gear ratio mode. On the other hand, when the operating point of the vehicle 1 exists outside region A, the gear ratio mode is switched to the variable gear ratio mode.

Figure 6:
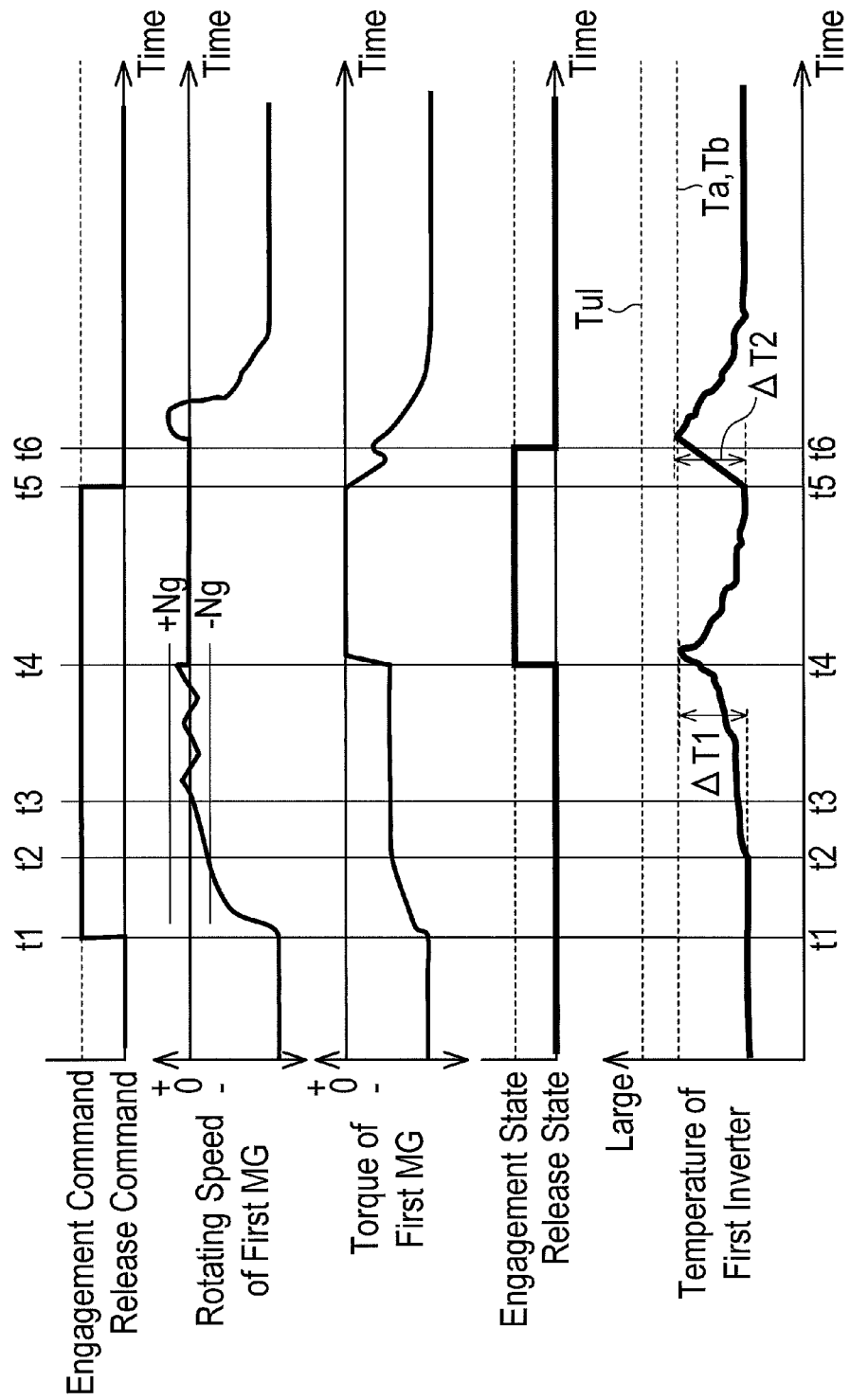
FIG. 6 is a graph showing an example of temporal variations of a command to the lock mechanism, rotating speed of a first MG, torque of the first MG, a state of the lock mechanism, and temperature of a first inverter, in a case that the lock mechanism is switched to an engagement state from a release state and then switched to the release state from the engagement state.

The HVECU 31 switches the state of the lock mechanism 13 according to the operating point of the vehicle 1 to switch the gear ratio mode. A control which is executed by the HVECU 31 when switching the gear ratio mode will be described with reference to FIG. 6. FIG. 6 shows temporal variations of the command to the lock mechanism 13, the rotating speed of the first MG 11, the torque of the first MG 11, the state of the lock mechanism 13, and the temperature of the first inverter 23 in a case that the lock mechanism 13 is switched to the engagement state from the release state and then switched to the release state from the engagement state.

First, a case that the gear ratio mode is switched to the fixed gear ratio mode from the variable gear ratio mode, that is, a case that the lock mechanism 13 is switched to the engagement state from the release state will be described. The HVECU 31 determines that a predetermined engagement condition is satisfied when the operating point of the vehicle 1 moves to inside of the region A from outside of the region A, and first controls the first MG 11 so that the rotating speed of the first MG 11 becomes zero. Hereinafter, this control is referred to as a rotating speed control. And, when a predetermined engagement switching condition is satisfied during execution of the rotating speed control, the HVECU 31 switches the state of the lock mechanism 13 to the engagement state. It is determined that the engagement switching condition is satisfied when the rotating speed of the first MG 11 is retained in a predetermined period within a rotating speed range which is set in the vicinity of zero, for example. As the rotating speed range, a range between a rotating speed +Ng and a rotating speed −Ng shown in FIG. 6 is set, for example. The rotating speed range may be obtained in advance through experiments, numerical calculations, or the like, and stored in the ROM of the HVECU 31.

Hereinafter, details will be described with respect to the above control method with reference to FIG. 6. In the example shown in this figure, at time t1, it is determined that the engagement condition is satisfied, and an engagement command is output. And, over a period from the time t1 to time t2, output torque of the first MG 11 is changed so that the rotating speed of the first MG 11 becomes zero. In the variable gear ratio mode, the first MG 11 outputs reaction torque against the output torque of the engine 10, and thereby, the torque of the engine 10 is transmitted to the output shaft 17. Thereby, the torque to be output from the first MG 11 during execution of this rotating speed control is determined according to the output torque of the engine 10. As is obvious from FIG. 4, it is necessary to change the rotating speed of the engine 10 in order to maintain the rotating speed of the output shaft 17 constant, when the rotating speed of the first MG 11 is changed. So, the HVECU 31 changes the rotating speed of the engine 10 as well as the rotating speed of the first MG 11. In this case, the engine 10 is controlled so that the output power therefrom is constant.

Figure 7:
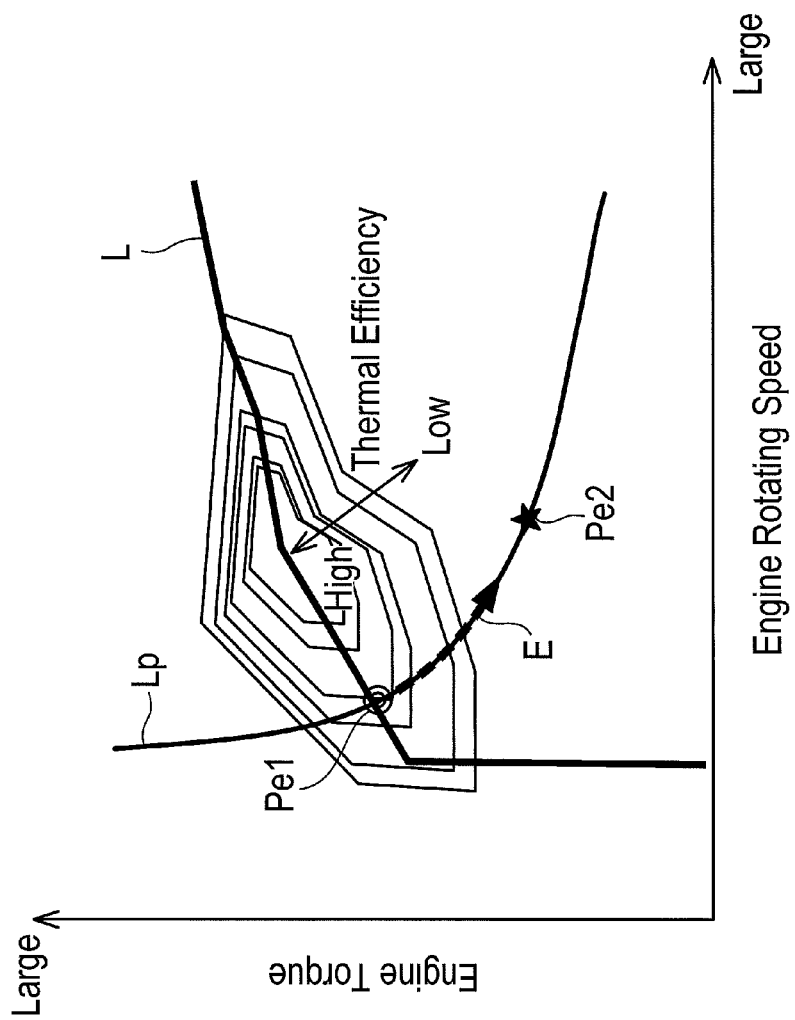
FIG. 7 is a diagram showing a relation between rotating speed of an internal combustion engine, torque of the internal combustion engine, and thermal efficiency of the internal combustion engine.

FIG. 7 shows a relation between the rotating speed, the torque, and thermal efficiency of the engine 10. When the gear ratio mode is the variable gear ratio mode, the engine 10 is controlled so that an operating point which is specified the engine rotating speed and the engine torque is moved on an operating line L in this figure. The operating line L can be set by experiments, numerical calculations, or the like, so that fuel efficiency of the engine 10 is optimized. A curved line Lp intersecting the operating line L shows an equal power line that makes the output power of the engine 10 constant. When the rotating speed of the engine 10 and the rotating speed of the first MG 11 are changed, the engine 10 is controlled so that the operating point moves on the equal power line Lp. Specifically, for example, in a case that the operating point of the engine 10 is a point Pe1 when the engagement condition is satisfied, the engine 10 is controlled so that the operating point moves in a direction of an arrow E in this figure. A point Pe2 in this figure shows an operating point of the engine 10 at the time t2. Since the engine 10 is controlled in this manner, it is possible to control the first MG 11 at equal power from the time t1 to the time t2.

Thereafter, the first MG 11 is controlled so that the output torque thereof is constant. On the other hand, as shown in FIG. 6, the rotating speed of the first MG 11 fluctuates in the rotating speed range after becoming zero at time t3. And, at time t4, it is determined that the engagement switching condition is satisfied, and the lock mechanism 13 is switched to the engagement state.

Next, a case that the gear ratio mode is switched to the variable gear ratio mode from the fixed gear ratio mode, that is, a case that the lock mechanism 13 is switched to the release state from the engagement state will be described. The HVECU 31 determines that a predetermined release condition is satisfied when the operating point of the vehicle 1 moves to outside of the region A from inside of the region A, and controls the first MG 11 so that the torque is output from the first MG 11. Hereinafter, this control is referred to as a torque control. When the lock mechanism 13 is switched to the release state while the output torque of the first MG 11 remains zero, since the first MG 11 is not possible to receive the torque of the engine 10, there is a possibility that the rotating speed of the output shaft 17 fluctuates. So, the torque is output from the first MG 11 in advance, before the lock mechanism 13 is switched to the release state. An amount of the torque is set according to the output power of the engine 10 outputted when the release condition is satisfied. In the example shown in FIG. 6, it is determined that the release condition is satisfied at time t5, and a release command is output. And, the torque is output from the first MG 11.

And, when a predetermined release switching condition is satisfied during execution of the torque control, the state of the lock mechanism 13 is switched to the release state. It is determined that the release switching condition is satisfied when the output torque of the first MG 11 becomes a torque which is capable of suppressing a fluctuation of the rotating speed of the output shaft 17 appropriately even through the state of the lock mechanism 13 is switched to the release state, for example. In the example shown in FIG. 6, it is determined that the release switching condition is satisfied at time t6, and the state of the lock mechanism 13 is switched to the release state.

As shown in FIG. 6, when the state of the lock mechanism 13 is switched, the temperature Tinv1 of the first inverter 23 increases. With respect to the first inverter 23, a predetermined working upper limit temperature Tul is set for protecting an electric circuit. And, when the temperature Tinv1 of the first inverter 23 reaches the working upper limit temperature Tul, the output power of the first inverter 23 is limited. Thereby, in a case that the temperature Tinv1 of the first inverter 23 reaches the working upper limit temperature Tul while the state of the lock mechanism 13 is switched, the rotating control of the first MG 11 or the torque control of the first MG 11 is stopped.

In the present invention, when the temperature Tinv1 of the first inverter 23 becomes equal to or higher than a predetermined engagement prohibition temperature Ta within a predetermined prohibition determination period set after the satisfaction of the engagement condition, it is prohibited to switch the lock mechanism 13 to the engagement state. And, an operation state of the engine 10 and an operation state of the first MG 11 are returned to their states at the moment when the engagement condition was satisfied respectively. As the engagement prohibition temperature Ta, a temperature which is lower than the working upper limit temperature Tul is set. For example, when the temperature Tinv1 of the first inverter 23 increases by a temperature difference ΔT1 (see FIG. 6) during execution of the rotating speed control, a value which is obtained by subtracting the temperature difference ΔT1 from the working upper limit temperature Tul is set as the engagement prohibition temperature Ta. The temperature difference ΔT1 may be obtained through experiments, numerical calculations, or the like. Specifically, for example, the temperature difference ΔT1 may be obtained as a temperature change of the first inverter 23 in the following situation. In a constant temperature condition, the rotating speed of the first MG 11 is retained in the vicinity of zero while the torque of the first MG 11 is maintained constant. And, the temperature difference ΔT1 may be obtained as the temperature change of the first inverter 23 from the above state up to the moment when an average time required for switching the lock mechanism 13 to the engagement state from the release state elapses. In the present embodiment, the value obtained in such a manner is set as an initial value of the temperature difference ΔT1. The engagement prohibition temperature Ta may be set based on this temperature difference ΔT1, and stored in the ROM of the HVECU 31. As the prohibition determination period, for example, a period when the first MG 11 can be controlled at equal power, that is, a period from the time t1 to the time t2 in FIG. 6 when the engine 10 is controlled at equal power is set.

Furthermore, in the present invention, in a case that the temperature Tinv1 of the first inverter 23 becomes equal to or higher than a predetermined release prohibition temperature Tb while the release condition is satisfied and the torque control is executed, a switching of the lock mechanism 13 to the release state is prohibited. And, an output of the torque from the first MG 11 is stopped. As the release prohibition temperature Tb, a temperature which is lower than the working upper limit temperature Tul is set. For example, when the temperature of the first inverter 23 increases by a temperature difference ΔT2 (see FIG. 6) during execution of the torque control, a value which is obtained by subtracting the temperature difference ΔT2 from the working upper limit temperature Tul is set to the release prohibition temperature Tb. As with the above described temperature difference ΔT1, the temperature difference ΔT2 may be also obtained in advance through experiments, numerical calculations, or the like. And, the release prohibition temperature Tb may be set based on this temperature difference ΔT2, and stored in the ROM of the HVECU 31. In the example shown in FIG. 6, since the temperature difference ΔT1 and the temperature difference ΔT2 are the same as each other, the engagement prohibition temperature Ta and the release prohibition temperature Tb are the same as each other.

Figure 8:
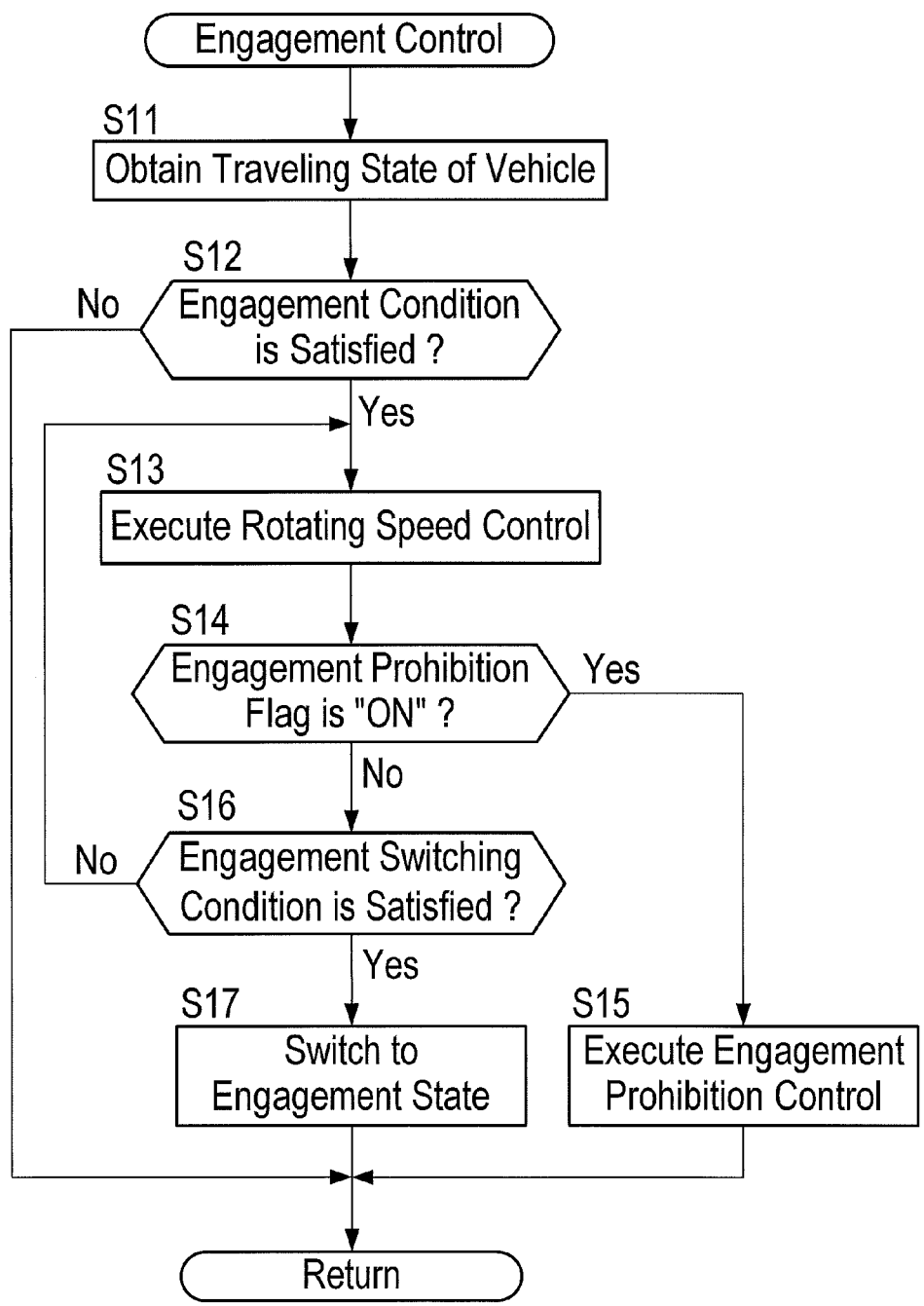
FIG. 8 is a flowchart showing an engagement control routine executed by a HVECU.

FIGS. 8-11 show routines where the HVECU 31 executes for controlling the lock mechanism 13, the engine 10, and the first MG 11 in this manner. FIG. 8 shows an engagement control routine where the HVECU 31 executes for switching the lock mechanism 13 to the engagement state from the release state. The HVECU 31 repeatedly executes this control routine at predetermined intervals while the vehicle 1 is traveling. Furthermore, the HVECU 31 executes this control routine in parallel to the other routines executed by the HVECU 31.

In the control routine, the HVECU 31 first obtains a traveling state of the vehicle 1 in step S11. The HVECU 31 obtains the vehicle speed, the accelerator opening, the rotating speed of the first MG 11, the rotating speed of the second MG 12, the rotating speed of the output shaft 17, the outside air temperature, the temperature of the first MG 11, the temperature of the second MG 12, the temperature Tinv1 of the first inverter 23, the temperature of the second inverter 25, the temperature of the cooling water of the cooling system 26, and the rotating speed of the engine 10 as the traveling state of the vehicle 1, for example. Furthermore, in this process, the HVECU 31 also obtains the required driving power based on the accelerator opening. In next step S12, the HVECU 31 determines whether or not the predetermined engagement condition is satisfied. As described above, it is determined that the engagement condition is satisfied when the operating point of the vehicle 1 moves to inside of the region A from outside of the region A. When the HVECU 31 determines that the engagement condition is not satisfied, the HVECU 31 ends the present control routine.

On the other hand, when the HVECU 31 determines that the engagement condition is satisfied, the HVECU 31 goes to step S13 and executes the rotating speed control. In next step S14, the HVECU 31 determines whether or not a state of an engagement prohibition flag is "ON". The engagement prohibition flag is a flag which indicates whether or not the switching of the lock mechanism 13 to the engagement state is prohibited. The engagement prohibition flag is set in an engagement prohibition determination routine shown in FIG. 9.

When the HVECU 31 determines that the state of the engagement prohibition flag is "ON", the HVECU 31 goes to step S15 and executes an engagement prohibition control. Thereafter, the HVECU 31 ends the present control routine. In the engagement prohibition control, as described above, the operation state of the engine 10 and the operation state of the first MG 11 are returned to the states when the engagement condition was satisfied.

On the other hand, when the HVECU 31 determines that the state of the engagement prohibition flag is "OFF", the HVECU 31 goes to step S16 and determines whether or not the engagement switching condition is satisfied. As described above, for example, it is determined that the engagement switching condition is satisfied when the rotating speed of the first MG 11 is retained in a predetermined period at the range between the rotating speed +Ng and the rotating speed −Ng. When the HVECU 31 determines that the engagement switching condition is not satisfied, the HVECU 31 returns to step S13 and executes steps S13, S14, and S16 repeatedly until the engagement switching condition is satisfied.

On the other hand, when the HVECU 31 determines that the engagement switching condition is satisfied, the HVECU 31 goes to step S17 and switches the state of the lock mechanism 13 to the engagement state. Thereafter, the HVECU 31 ends the present control routine.

Figure 9:
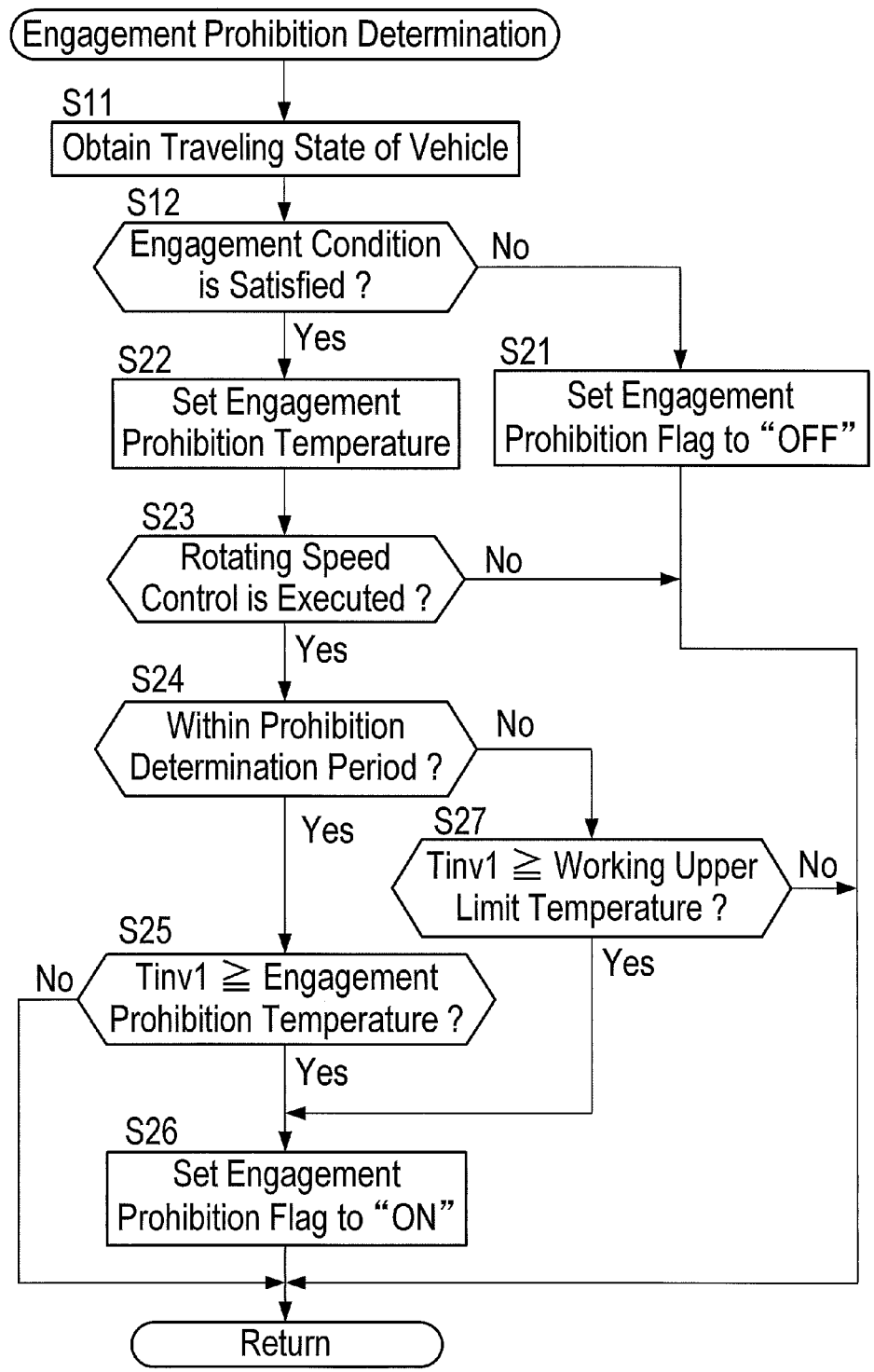
FIG. 9 is a flowchart showing an engagement prohibition determination routine executed by the HVECU.

As described above, the engagement prohibition flag is set in the engagement prohibition determination routine in FIG. 9. The HVECU 31 repeatedly executes this routine at predetermined intervals while the vehicle 1 is traveling. In FIG. 9, the same processes as those of the routine of FIG. 8 are denoted by the same reference numerals respectively, and descriptions thereof will be omitted.

In this routine, the HVECU 31 first obtains the traveling state of the vehicle 1 in step S11. Next, in step S12, the HVECU 31 determines whether or not the engagement condition is satisfied. When the HVECU 31 determines that the engagement condition is not satisfied, the HVECU 31 goes to step S21 and switches the state of the engagement prohibition flag to "OFF". Thereafter, the HVECU 31 ends the present routine.

On the other hand, when the HVECU 31 determines that the engagement condition is satisfied, the HVECU 31 goes to step S22 and sets the engagement prohibition temperature Ta. In this process, the HVECU 31 adjusts the engagement prohibition temperature Ta according to a temperature change of the first inverter 23 obtained in a previous time when the lock mechanism 13 was switched to the engagement state. Specifically, a temperature change which was indicated by the temperature Tinv1 of the first inverter 23 in the previous time when the lock mechanism 13 was switched to the engagement state from the release state, that is, the temperature difference L\T1 in FIG. 6 is obtained. As is obvious from FIG. 6, the temperature difference ΔT1 is a difference between the temperature Tinv1 of the first inverter 23 when the rotating speed control is started up and a maximum temperature that the temperature Tinv1 of the first inverter 23 reaches when the lock mechanism 13 is switched to the engagement state. The temperature difference ΔT1 may be stored in the RAM of the HVECU 31. And, the HVECU 31 adjusts the engagement prohibition temperature Ta based on the temperature difference ΔT1 of the previous time. For example, when a value which is obtained by subtracting the temperature difference ΔT1 of the previous time from the working upper limit temperature Tul is greater than the present engagement prohibition temperature Ta, the HVECU 31 increases the engagement prohibition temperature Ta. On the other hand, when the value which is obtained by subtracting the temperature difference ΔT1 of the previous time from the working upper limit temperature Tul is less than the present engagement prohibition temperature Ta, the HVECU 31 decreases the engagement prohibition temperature Ta. Furthermore, in this process for setting the engagement prohibition temperature Ta, the HVECU 31 may adjust the engagement prohibition temperature Ta according to at least any one of the outside air temperature, the temperature of the cooling water of the cooling system 26, and a flow rate of the cooling water which are obtained at the moment when the engagement condition is satisfied. In general, the temperature of each of the first MG 11, the second MG 12, the first inverter 23, and the second inverter 25 is likely to increase as the outside air temperature is higher. Similarly, the temperature of each of the first MG 11 and the first inverter 23 is likely to increase as the temperature of the cooling water of the cooling system 26 is higher. And, the temperature of each of the first MG 11 and the first inverter 23 is likely to increase as the flow rate of the cooling water of the cooling system 26 is smaller. So, the HVECU 31 decreases the engagement prohibition temperature Ta as the outside air temperature is higher. The HVECU 31 decreases the engagement prohibition temperature Ta as the temperature of the cooling water is higher. The HVECU 31 decreases the engagement prohibition temperature Ta as the flow rate of the cooling water is smaller.

In next step S23, the HVECU 31 determines whether or not the rotating speed control is being executed. When the HVECU 31 determines that the rotating speed control is not being executed, the HVECU 31 ends the present routine. On the other hand, when the HVECU 31 determines that the rotating speed control is being executed, the HVECU 31 goes to step S24 and determines whether or not the present time is within the prohibition determination period. As described above, as the prohibition determination period, the period when the first MG 11 can be controlled at equal power is set. When the HVECU 31 determines that the present time is within the prohibition determination period, the HVECU 31 goes to step S25 and determines whether or not the temperature Tinv1 of the first inverter 23 is equal to or higher than the engagement prohibition temperature Ta. When the HVECU 31 determines that the temperature Tinv1 of the first inverter 23 is less than the engagement prohibition temperature Ta, the HVECU 31 ends the present routine.

On the other hand, when the HVECU 31 determines that the temperature Tinv1 of the first inverter 23 is equal to or higher than the engagement prohibition temperature Ta, the HVECU 31 goes to step S26 and switches the state of the engagement prohibition flag to "ON". Thereafter, the HVECU 31 ends the present routine.

In step S24, when the HVECU 31 determines that the present time is not within the prohibition determination period, the HVECU 31 goes to step S27 and determines whether or not the temperature Tinv1 of the first inverter 23 is equal to or higher than the working upper limit temperature Tul. When the HVECU 31 determines that the temperature Tinv1 of the first inverter 23 is equal to or higher than the working upper limit temperature Tul, the HVECU 31 goes to step S26 and switches the state of the engagement prohibition flag to "ON". Thereafter, the HVECU 31 ends the present routine. On the other hand, when the HVECU 31 determines that the temperature Tinv1 of the first inverter 23 is less than the working upper limit temperature Tul, the HVECU 31 ends the present routine.

Figure 10:
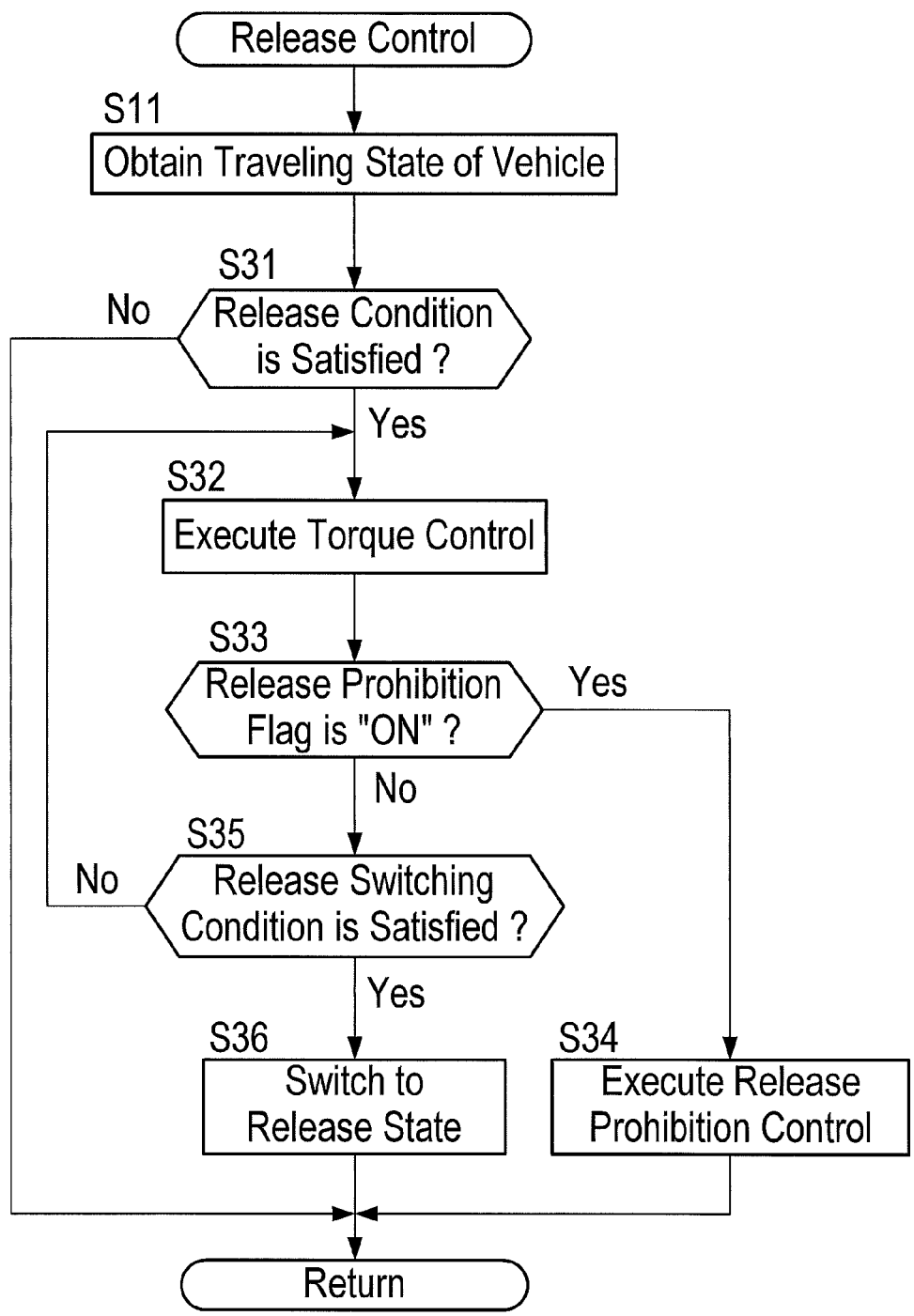
FIG. 10 is a flowchart showing a release control routine executed by the HVECU.

FIG. 10 shows a release control routine where the HVECU 31 executes for switching the lock mechanism 13 to the release state from the engagement state. The HVECU 31 repeatedly executes this control routine at predetermined intervals while the vehicle 1 is traveling. Furthermore, the HVECU 31 executes this control routine in parallel to the other routines executed by the HVECU 31. In FIG. 10, the same processes as those of the routine of FIG. 8 are denoted by the same reference numerals respectively, and descriptions thereof will be omitted.

In the control routine, the HVECU 31 first obtains a traveling state of the vehicle 1 in step S11. In next step S31, the HVECU 31 determines whether or not the predetermined release condition is satisfied. As described above, it is determined that the release condition is satisfied when the operating point of the vehicle 1 moves to outside of the region A from inside of the region A. When the HVECU 31 determines that the release condition is not satisfied, the HVECU 31 ends the present control routine.

On the other hand, when the HVECU 31 determines that the release condition is satisfied, the HVECU 31 goes to step S32 and executes the torque control. In next step S33, the HVECU 31 determines whether or not a state of a release prohibition flag is "ON". The release prohibition flag is a flag which indicates whether or not the switching of the lock mechanism 13 to the release state is prohibited. The release prohibition flag is set in a release prohibition determination routine shown in FIG. 11.

When the HVECU 31 determines that the state of the release prohibition flag is "ON", the HVECU 31 goes to step S34 and executes a release prohibition control. Thereafter, the HVECU 31 ends the present control routine. In the release prohibition control, as described above, the output of the torque from the first MG 11 is stopped.

On the other hand, when the HVECU 31 determines that the state of the release prohibition flag is "OFF", the HVECU 31 goes to step S35 and determines whether or not the release switching condition is satisfied. As described above, for example, it is determined that the release switching condition is satisfied when the output torque of the first MG 11 becomes the torque which is capable of suppressing the fluctuation of the rotating speed of the output shaft 17 appropriately, even through the state of the lock mechanism 13 is switched to the release state. When the HVECU 31 determines that the release switching condition is not satisfied, the HVECU 31 returns to step S32 and executes steps S32, S33, and S35 repeatedly until the release switching condition is satisfied.

On the other hand, when the HVECU 31 determines that the release switching condition is satisfied, the HVECU 31 goes to step S36 and switches the state of the lock mechanism 13 to the release state. Thereafter, the HVECU 31 ends the present control routine.

Figure 11:
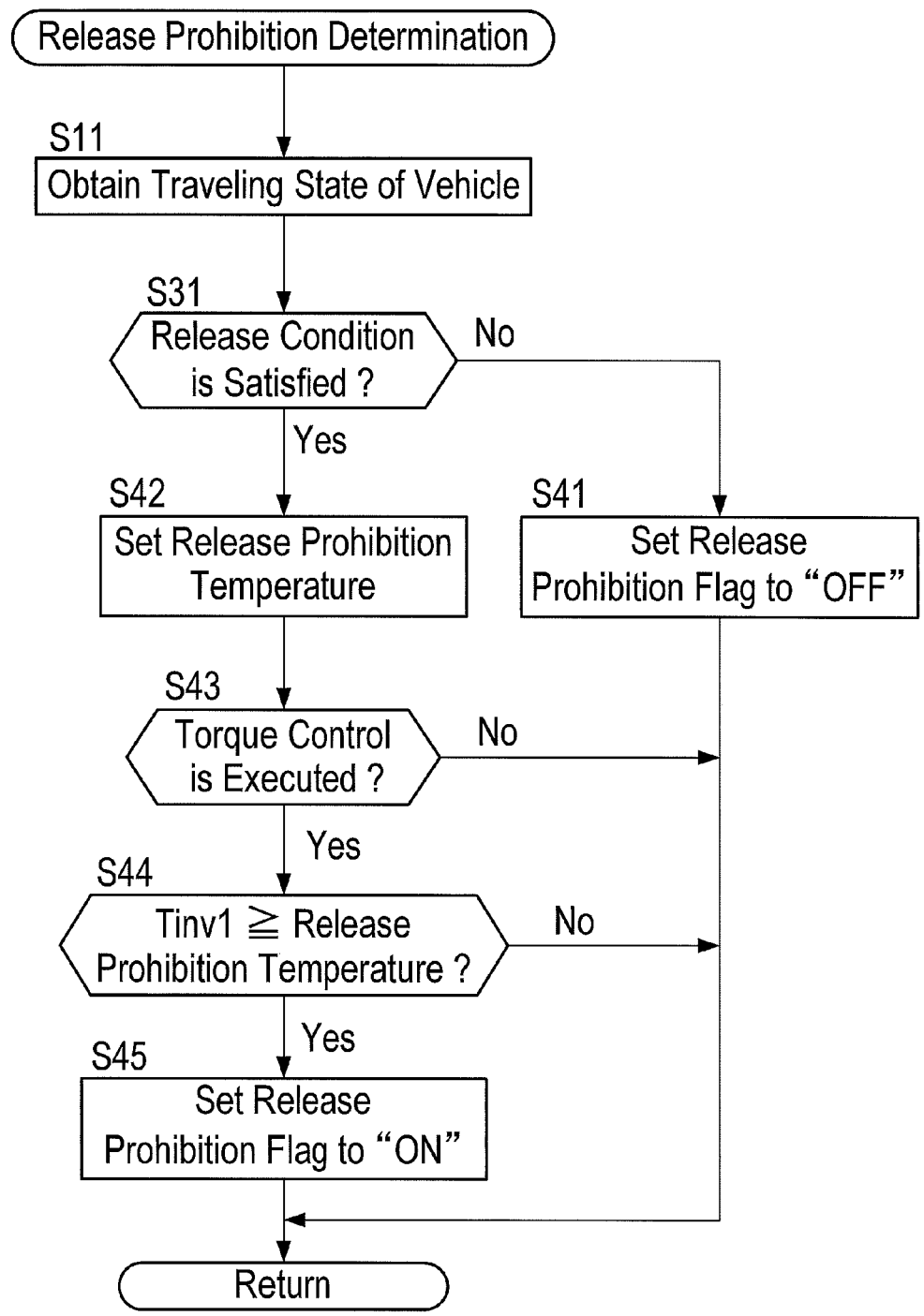
FIG. 11 is a flowchart showing a release prohibition determination routine executed by the HVECU.

As described above, the release prohibition flag is set in the release prohibition determination routine in FIG. 11. The HVECU 31 repeatedly executes this routine at predetermined intervals while the vehicle 1 is traveling. In FIG. 11, the same processes as those of the routine of FIG. 8 or FIG. 10 are denoted by the same reference numerals respectively, and descriptions thereof will be omitted.

In this routine, the HVECU 31 first obtains the traveling state of the vehicle 1 in step S11. Next, in step S31, the HVECU 31 determines whether or not the release condition is satisfied. When the HVECU 31 determines that the release condition is not satisfied, the HVECU 31 goes to step S41 and switches the state of the release prohibition flag to "OFF". Thereafter, the HVECU 31 ends the present routine.

On the other hand, when the HVECU 31 determines that the release condition is satisfied, the HVECU 31 goes to step S42 and sets the release prohibition temperature Tb. In this process, the HVECU 31 adjusts the release prohibition temperature Tb according to a temperature change of the first inverter 23 obtained in a previous time when the lock mechanism 13 was switched to the release state. Specifically, a temperature change which was indicated by the temperature Tinv1 of the first inverter 23 in the previous time when the lock mechanism 13 was switched to the release state from the engagement state, that is, the temperature difference $\Delta T2$ in FIG. 6 is obtained. As is obvious from FIG. 6, the temperature difference $\Delta T2$ is a difference between the temperature Tinv1 of the first inverter 23 when the torque control is started up and a maximum temperature that the temperature Tinv1 of the first inverter 23 reaches when the lock mechanism 13 is switched to the release state. The temperature difference $\Delta T2$ may be stored in the RAM of the HVECU 31. And, the HVECU 31 adjusts the release prohibition temperature Tb based on the temperature difference $\Delta T2$ of the previous time. For example, when a value which is obtained by subtracting the temperature difference $\Delta T2$ of the previous time from the working upper limit temperature Tul is greater than the present release prohibition temperature Ta, the HVECU 31 increases the release prohibition temperature Tb. On the other hand, when the value which is obtained by subtracting the temperature difference $\Delta T2$ of the previous time from the working upper limit temperature Tul is less than the present release prohibition temperature Tb, the HVECU 31 decreases the release prohibition temperature Tb. Furthermore, in this process for the release prohibition temperature Tb, the HVECU 31 may adjust the release prohibition temperature Tb according to at least any one of the outside air temperature, the temperature of the cooling water of the cooling system 26, and the flow rate of the cooling water which are obtained at the moment when the release condition is satisfied. Specifically, the HVECU 31 decreases the release prohibition temperature Tb as the outside air temperature is higher. The HVECU 31 decreases the release prohibition temperature Tb as the temperature of the cooling water is higher. The HVECU 31 decreases the release prohibition temperature Tb as the flow rate of the cooling water is smaller.

In next step S43, the HVECU 31 determines whether or not the torque control is being executed. When the HVECU 31 determines that the torque control is not being executed, the HVECU 31 ends the present routine. On the other hand, when the HVECU 31 determines that the torque control is being executed, the HVECU 31 goes to step S44 and determines whether or not the temperature Tinv1 of the first inverter 23 is equal to or higher than the release prohibition temperature Tb. When the HVECU 31 determines that the temperature Tinv1 of the first inverter 23 is less than the release prohibition temperature Tb, the HVECU 31 ends the present routine. On the other hand, when the HVECU 31 determines that the temperature Tinv1 of the first inverter 23 is equal to or higher than the release prohibition temperature Tb, the HVECU 31 goes to step S45 and switches the state of the release prohibition flag to "ON". Thereafter, the HVECU 31 ends the present routine.

As described above, in the control apparatus of the present invention, when the temperature Tinv1 of the first inverter 23 becomes equal to or higher than the engagement prohibition temperature Ta during execution of the rotating speed control, the engagement of the lock mechanism 13 is prohibited. Thereby, when the state of the lock mechanism 13 is switched to the engagement state, it is possible to suppress an occurrence of hunting of a control of the first MG 11. Furthermore, since the engagement prohibition temperature Ta is less than the working upper limit temperature Tul, it is possible to prohibit the engagement of the lock mechanism 13 before the temperature of the first inverter 23 reaches around the working upper limit temperature Tul. Thereby, it is possible to suppress an increase of each of the temperature of the first MG 11 and the temperature of the first inverter 23. Accordingly, it is possible to suppress a limitation of an operation of the first MG 11 which is caused by either the temperature of the first inverter 23 or the temperature of the first MG 11.

The determination whether or not to prohibit the engagement of the lock mechanism 13 is performed in the period when the first MG 11 can be controlled at equal power. As shown in FIG. 6, in this period, the temperature Tinv1 of the first inverter 23 is hardly changed. Thereby, it is possible to determine whether or not to prohibit the engagement of the lock mechanism 13 with higher precision. Furthermore, as shown in FIG. 7, in this period, the engine 10 is operated at equal power. Thereby, it is possible to suppress an unnecessary fluctuation of the rotating speed of the engine 10. Accordingly, it is possible to suppress a vibration of the vehicle 1.

The engagement prohibition temperature Ta is adjusted based on the change in the temperature Tinv1 of the first inverter 23 obtained in a previous time when the state of the lock mechanism 13 was switched to the engagement state. Furthermore, the engagement prohibition temperature Ta is also adjusted according to at least any one of the outside air temperature, the temperature of the cooling water of the cooling system 26, and the flow rate of the cooling water which are obtained when the engagement condition is satisfied. By adjusting the engagement prohibition temperature Ta in this manner, it is possible to suppress an unnecessary prohibition of the engagement control of the lock mechanism 13.

Furthermore, in the control apparatus of the present invention, when the temperature Tinv1 of the first inverter 23 becomes equal to or higher than the release prohibition temperature Tb during the execution of the torque control, the release of the lock mechanism 13 is prohibited. Thereby, when the state of the lock mechanism 13 is switched to the release state, it is possible to suppress the occurrence of hunting of the control of the first MG 11. Furthermore, since the release prohibition temperature Tb is less than the working upper limit temperature Tul, it is possible to suppress an increase of each of the temperature of the first MG 11 and the temperature of the first inverter 23. Accordingly, it is possible to suppress the limitation of the operation of the first MG 11 which is caused by either the temperature of the first inverter 23 or the temperature of the first MG 11.

The release prohibition temperature Tb is adjusted based on the change in the temperature Tinv1 of the first inverter 23 obtained in a previous time when the state of the lock mechanism 13 was switched to the release state. Furthermore, the release prohibition temperature Tb is also adjusted according to at least any one of the outside air temperature, the temperature of the cooling water of the cooling system 26, and the flow rate of the cooling water which are obtained at the moment when the release condition is satisfied. Thereby, it is possible to suppress an unnecessary prohibition of the release control of the lock mechanism 13.

The prohibition determination period is not limited to the period when the first MG 11 is controlled at equal power. For example, a period from the moment when the rotating speed control is started up to the moment when the rotating speed of the first MG 11 enters the rotating speed range between the rotating speed +Ng and the rotating speed −Ng, may be set to the prohibition determination period. As shown in FIG. 6, until the rotating speed of the first MG 11 enters this rotating speed range, the operating point of the engine 10 moves on the equal power line Lp in FIG. 7. Thereby, it is possible to control the first MG 11 at equal power. Thereby, even when such a period is set as the prohibition determination period, it is possible to suppress the unnecessary fluctuation of the rotating speed of the engine 10. Furthermore, without setting the prohibition determination period, it may be determined whether or not the engagement control of the lock mechanism 13 is prohibited while the rotating speed control is executed.

In the present invention, it may not be determined whether or not the control is prohibited in both of the case that the lock mechanism 13 is switched to the release state from the engagement state and the case that the lock mechanism 13 is switched to the engagement state from the release state. In either the former case or the latter case, it may be determined whether or not the control is prohibited in only any one of these cases. Also in this case, it is possible to suppress of an occurrence of hunting of any one of the control that the lock mechanism 13 is switched to the engagement state and the control that the lock mechanism 13 is switched to the release state.

In the above-described embodiment, it is determined whether or not the switching control of the lock mechanism 13 is prohibited based on the temperature Tinv1 of the first inverter 23. However, temperature which is used in this determination is not limited to the temperature Tinv1 of the first inverter 23. For example, it may be determined whether or not the switching control is prohibited by using the temperature of the first MG 11. Furthermore, the temperature of the cooling water of the cooling system 26 changes according to the temperature Tinv1 of the first inverter 23 and the temperature of the first MG 11. Accordingly, it may be determined whether or not the switching control is prohibited by using the temperature of the cooling water. That is, it may be determined whether or not the switching control is prohibited by using various temperatures to be monitored when the first MG 11 is controlled. Thereby, the temperature Tinv1 of the first inverter 23, each of the temperature of the first MG 11, and the temperature of the cooling water of the cooling system 26 corresponds to a monitoring target temperature of the present invention.

In the above-described embodiment, the first MG 11 corresponds to an electric motor of the present invention. The carrier C corresponds to a first rotational element of the present invention. The sun gear S corresponds to a second rotational element of the present invention. The ring gear R corresponds to a third rotational element of the present invention. The first drive gear 16 corresponds to a transmission member of the present invention. The lock mechanism 13 corresponds to an engagement mechanism of the present invention. By executing the control routines of FIG. 8 or FIG. 10, the HVECU 31 functions as a control device of the present invention. By executing the routine of FIG. 9 and step S15 of FIG. 8, or the routine of FIG. 11 and step S34 of FIG. 10, the HVECU 31 functions as a switching prohibition device of the present invention.

The present invention is not limited to the above-described embodiments, and various modifications of the present invention may be provided. For example, an engine to which the present invention is applied is not limited to the spark ignition type internal combustion engine. The present invention may be applied to a compression-ignition type diesel engine. Furthermore, in the above-described embodiments, the single pinion type power split mechanism is shown. However, a power split mechanism of a vehicle to which the present invention is applied is not limited to this power split mechanism. The power split mechanism may be a double pinion type power split mechanism using a double pinion type planetary gear mechanism. Furthermore, the power split mechanism may be a combination planetary gear type power split mechanism using plural planetary gear mechanisms. In this case, a connecting object member of each of rotational elements of the power split mechanism is changed appropriately.

What is claimed:

1. A control apparatus which is applied to a hybrid vehicle, the hybrid vehicle including:

an internal combustion engine;

an electric motor being connected electrically with a battery via an inverter;

an output portion transmitting torque to a drive wheel;

a power split mechanism having a first rotational element, a second rotational element, and a third rotational element which are capable of differentially rotating with respect to each other, the first rotational element being connected to an output shaft of the internal combustion engine, the second rotational element being connected to an output shaft of the electric motor, and the third rotational element being connected to a transmission member of the output portion; and an engagement mechanism which is capable of switching between an engagement state where the output shaft of the electric motor is locked so as not to rotate and a release state where a rotation of the output shaft of the electric motor is permitted, a control apparatus including an electronic control unit (ECU) including a computer having a microprocessor, a RAM, and a ROM, wherein signals are input to the ECU from a plurality of sensors located on the hybrid vehicle, the ECU configured to:

limit, in a case that a monitoring target temperature to be monitored when the electric motor is controlled becomes equal to or higher than a predetermined upper limit temperature when torque is output from the electric motor, an output of the torque from the electric motor, the monitoring target temperature being a temperature of the electric motor or the inverter, wherein the ECU controls the electric motor and the engagement mechanism, and the ECU is programmed to:

first execute a rotating speed control which makes the electric motor output a torque according to an output torque of the internal combustion engine so that a rotating speed of the electric motor becomes zero, in a case that a predetermined engagement condition for a permission to switch a state of the engagement mechanism from the release state to the engagement state is satisfied while the internal combustion engine is operated; and programmed to subsequently execute an engagement control which switches a state of the engagement mechanism to the engagement state when a predetermined engagement switching condition is satisfied during an execution of the rotating speed control, and the ECU is programmed to prohibit an execution of the engagement control, when the monitoring target temperature becomes equal to or higher than a predetermined engagement prohibition temperature which is lower than the predetermined upper limit temperature during the execution of the rotating speed control.

2. The control apparatus according to claim 1, wherein the ECU is further programmed to determine whether or not the monitoring target temperature becomes equal to or higher than the engagement prohibition temperature, in a period when the electric motor is controlled at equal power during the execution of the rotating speed control.

3. The control apparatus according to claim 1, wherein the ECU is further programmed to determine whether or not the monitoring target temperature becomes equal to or higher than the engagement prohibition temperature, in a period where until the rotating speed of the electric motor enters a predetermined rotating speed range which is set in a vicinity of zero, during the execution of the rotating speed control.

4. The control apparatus according to claim 1, wherein the ECU is further programmed to adjust the engagement prohibition temperature based on a change of the monitoring target temperature obtained in a previous time when the engagement mechanism was switched to the engagement state from the release state.

5. The control apparatus according to claim 1, wherein the ECU is further programmed to: first execute a torque control which makes the electric motor output a torque according to the output torque of the internal combustion engine, in a case that a predetermined release condition for a permission to switch a state of the engagement mechanism from the engagement state to the release state is satisfied while the internal combustion engine is operated; and subsequently execute a release control which switches the state of the engagement mechanism to the release state when a predetermined release switching condition is satisfied during an execution of the torque control, and the ECU is further programmed to prohibit an execution of the release control, when the monitoring target temperature becomes equal to or higher than a predetermined release prohibition temperature which is lower than the predetermined upper limit temperature during the execution of the torque control.

6. The control apparatus according to claim 5, wherein the switching prohibition programming instructions further comprise programming instructions to the ECU is further programmed to adjust the release prohibition temperature based on a change of the monitoring target temperature obtained in a previous time when the engagement mechanism was switched to the release state from the engagement state.

7. A control apparatus which is applied to a hybrid vehicle, the hybrid vehicle including:
an internal combustion engine;
an electric motor being connected electrically with a battery via an inverter;
an output portion transmitting torque to drive wheel;
a power split mechanism having a first rotational element, a second rotational element, and a third rotational element which are capable of differentially rotating with respect to each other, the first rotational element being connected to an output shaft of the internal combustion engine, the second rotational element being connected to an output shaft of the electric motor, and the third rotational element being connected to a transmission member of the output portion; and
an engagement mechanism which is capable of switching between an engagement state where the output shaft of the electric motor is locked so as not to rotate and a release state where a rotation of the output shaft of the electric motor is permitted,
a control apparatus including an electronic control unit (ECU) including a computer having a microprocessor, a RAM, and a ROM, wherein signals are input to the ECU from a plurality of sensors located on the hybrid vehicle, the ECU configured to:
limit, in a case that a monitoring target temperature to be monitored when the electric motor is controlled becomes equal to or higher than a predetermined upper limit temperature when torque is output from the electric motor, an output of the torque from electric motor, the monitoring target temperature being a temperature of the electric motor or the inverter, wherein
the ECU controls the electric motor and the engagement mechanism, and
the ECU is programmed to first execute a torque control which makes the electric motor output a torque according to output torque of the internal combustion engine, in a case that a predetermined release condition for a permission to switch a state of the engagement mechanism from the engagement state to the release state is satisfied while the internal combustion engine is operated; and subsequently execute a release control which switches the state of the engagement mechanism to the release state when a predetermined release switching condition is satisfied during an execution of the torque control, and
the ECU is programmed to prohibit an execution of the release control, when the monitoring target temperature becomes equal to or higher than a predetermined release prohibition temperature which is lower than the predetermined upper limit temperature during the execution of the torque control.

* * * * *